H. B. MARTIN.
Brake Reaction Movements.

No. 140,057. Patented June 17, 1873.

Witnesses:

Inventor:
Horace B. Martin

UNITED STATES PATENT OFFICE.

HORACE B. MARTIN, OF SAN FRANCISCO, CALIFORNIA.

IMPROVEMENT IN BRAKE REACTION MOVEMENTS.

Specification forming part of Letters Patent No. 140,057, dated June 17, 1873; application filed October 1, 1872.

*To all whom it may concern:*

Be it known that I, HORACE B. MARTIN, of San Francisco, State of California, have invented a Brake Reaction Movement, of which the following is a specification:

The object of this invention is to enable the operator to graduate the speed of machinery at will, to change motion from one part to another, and to enable one part of a machine to run faster than another while driven by the same pulley or pinion, and still perform its service, as, for instance, the two drivers of a traction-engine to pull with equal force while passing round a curve.

Figure 1:
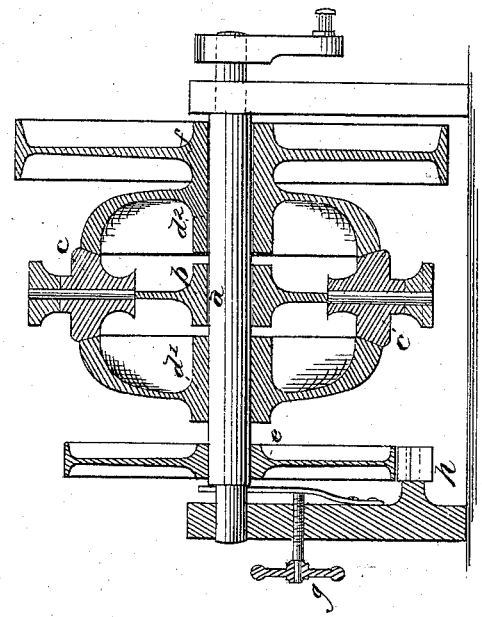
Figure 2:
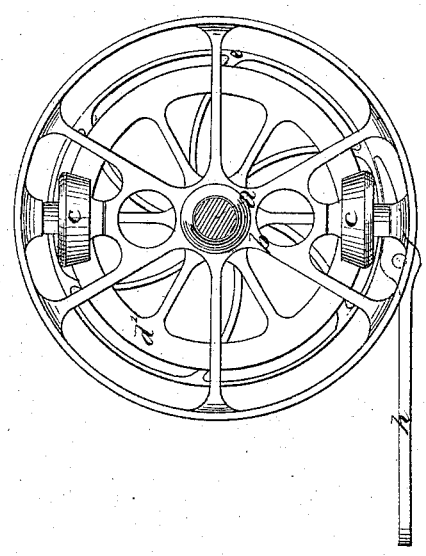

The device is illustrated in detail in the plan view, Figure 1, and the vertical section, Fig. 2, in which—

$a$ represents a shaft with brake-wheel and bevel-gear $d^1$ keyed fast, and wheel $b$ and bevel-disk $d^2$, with pulley $f$ attached, running loosely thereon. $b$ is a pulley or wheel running loosely on shaft $a$ between fixed disk $d^1$ and loose disk $d^2$, with two transverse bevel-wheels, $c\ c$, contained and running within it, as shown, serving as intermediates to enable wheel $b$ to engage with disks $d^1$ and $d^2$. $c\ c$ represent two bevel-wheels contained within, and running loosely on, shafts set radially to wheel $b$, as shown, and engaging at opposite points, and equidistant from the center of shaft $a$, with the two disks $d^1$ and $d^2$; $d^1$, bevel disk keyed fast on shaft $a$; $d^2$, bevel disk running loosely on shaft $a$; $e$, break-wheel keyed on shaft $a$; $f$, pulley from which to convey motion to machinery, running loosely on shaft $a$, but attached to, and running with, loose disk $d^2$; $g$, set-screw to give contact to the parts when operated by friction; $h$, brake engaging with friction-wheel $e$.

Connect the power by belt or gearing with wheel $b$, at its perephery, and motion will be imparted equally to disks $d^1$ and $d^2$, if each offer equal resistance. Now, if brake $h$ be applied to $d^1$, the speed of $d^2$ will be increased, and that of $d^1$ will be corespondingly diminished, and if brake $h$ be fully set, $d^1$ will stop, and $d^2$ will run at double the speed of shaft $a$, and vice versa; and in a traction-engine in passing round a curve each driving-wheel will pull equally, though traveling at different rates of speed.

I claim as my invention—

The brake reaction movement, substantially as described, consisting of wheel $b$ with the contained transverse wheels $c\ c$, disks $d^1\ d^2$, wheels $e$ and $f$, and brake $h$, as and for the purposes specified.

HORACE B. MARTIN.

Witnesses:
HENRY A. NISBET,
J. B. S. LESSVOIND.